Nov. 17, 1970  G. L. WALLACE  3,541,594

SEWAGE ELIMINATION APPARATUS

Filed Dec. 3, 1968

INVENTOR
GORDON L. WALLACE
BY
Woodard, Weikart, Emhardt & Naughton
Attorneys

United States Patent Office 3,541,594
Patented Nov. 17, 1970

3,541,594
SEWAGE ELIMINATION APPARATUS
Gordon L. Wallace, Indianapolis, Ind., assignor to Aquapure, Inc., Indianapolis, Ind., a corporation of Indiana
Continuation-in-part of application Ser. No. 599,845, Dec. 7, 1966. This application Dec. 3, 1968, Ser. No. 780,641
The portion of the term of the patent subsequent to Oct. 7, 1986, has been disclaimed
Int. Cl. B01d 43/00
U.S. Cl. 210—121   4 Claims

ABSTRACT OF THE DISCLOSURE

Disclosed is an apparatus for the combustion of sewage by controlled feeding of the sewage input from a sewage accumulator section to a heating and oxidizing section. The fly ash, carbon dioxide and steam produced by combustion of the sewage is led into a fly ash collector section and the steam is discharged to the atmosphere or may be used for heating, or may be condensed to provide a usable water supply.

CROSS-REFERENCE TO RELATED APPLICATION

This application is a continuation-in-part of my copending patent application Ser. No. 599,845, filed Dec. 7, 1966, now Pat. No. 3,471,020.

BACKGROUND OF THE INVENTION

There are numerous areas of the country where sanitary sewers are nonexistent, or economically inaccessible, and where soil conditions preclude the use of septic tanks. In such areas, especially where the population is increasing quite rapidly, for example in suburban and rural areas, the cost of installing a conventional sanitary sewer system and treatment plant is prohibitive. Much of the domestic waste in these areas is being discharged into streams, or into open ditches where it eventually finds its way to larger streams. Even where septic tanks are in use and where soil conditions for such use are ideal, the soil and streams tend to become polluted as population density grows.

Although the volume of domestic waste from any one residence would not create a significant stream pollution problem, unless the stream were quite small, the cumulative effect of the domestic waste from even a small number of residences can cause considerable pollution. In addition, where open ditches are used, noxious odors are given off by the decaying waste and the ditches provide ideal breeding areas for mosquitos and other insect pests. Disposal installations are coming more and more into use to alleviate the pollution problem. Block-size or subdivision-size disposal installations, however, are characterized by relatively high unit cost. Cost of these disposal units is a prohibitive economic load on small community groups of suburban dwellings and, particularly, on mobile home groups and camper parks.

SUMMARY

The apparatus herein described utilizes a relatively compact structure which can economically provide sewage disposal for units as small as single residences. The heat generated in the combustion process can be used as a heating source for the dwelling and the distilled water, a residual by-product, can be returned, without pollution danger, to the ground or streams, or can be reused. The apparatus is automatic in operation and can be serviced by a relatively unskilled person. While of primary importance with respect to small capacity installations, enlarged versions of the apparatus can be utilized for industrial plants and for larger sub-division or multiple-home groupings.

DESCRIPTION OF THE PREFERRED EMBODIMENT

Figure 1:
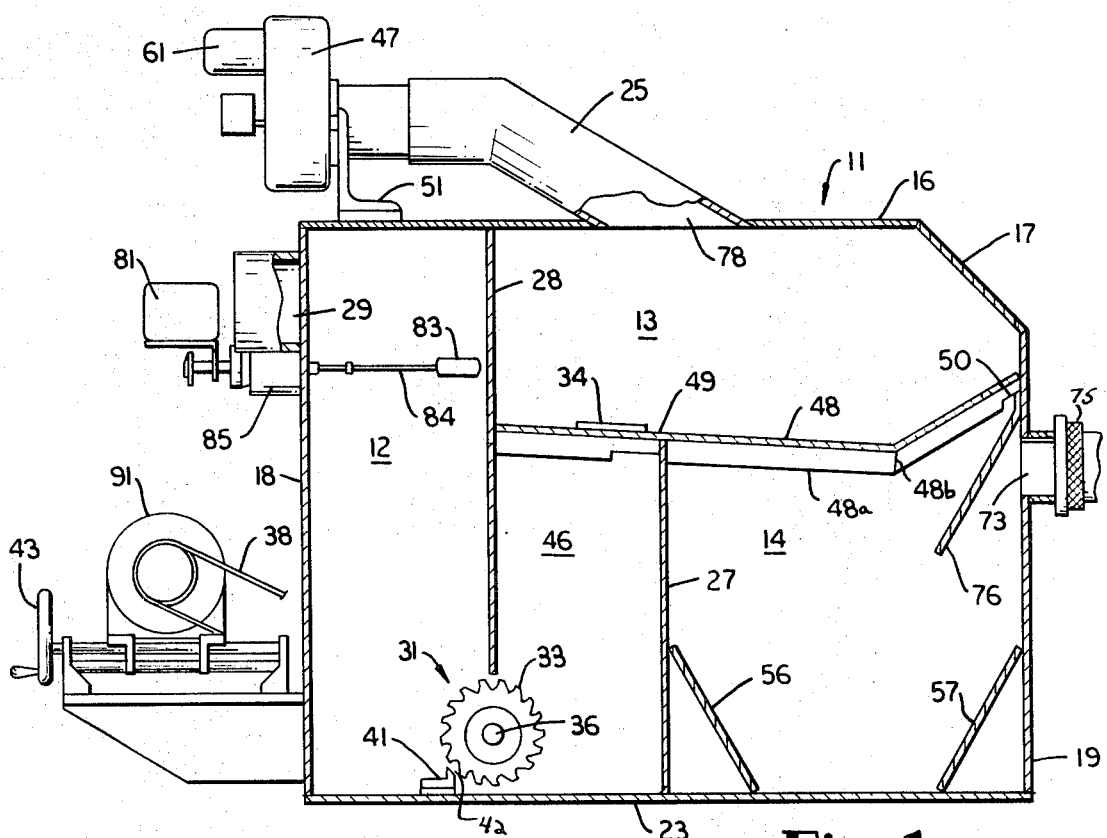
FIG. 1 is a side elevation of the apparatus of this invention.
Figure 2:
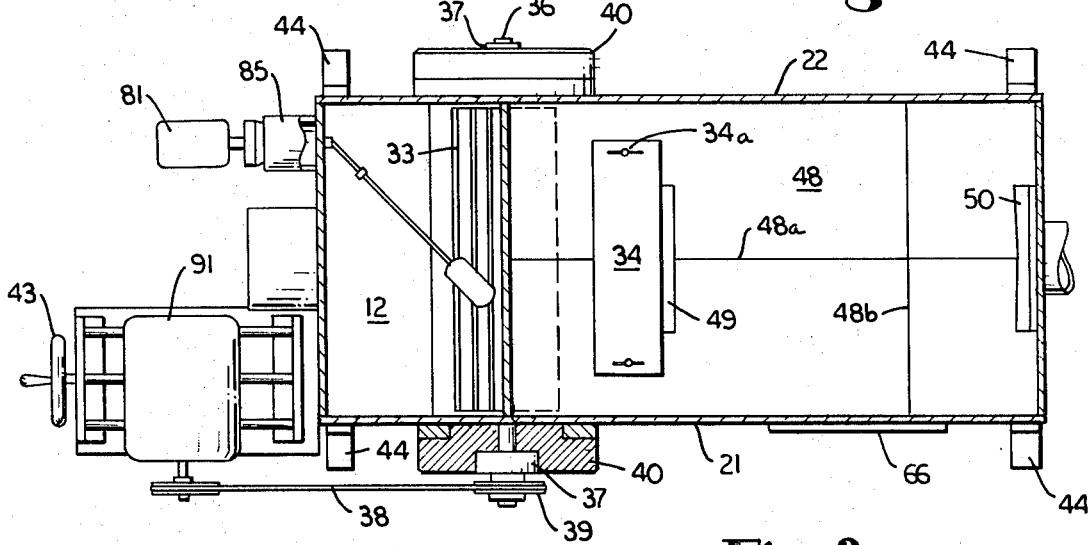
FIG. 2 is a top view of the apparatus of FIG. 1.

The apparatus of the present invention is substantially enclosed in a generally inverted rectangular housing 11, which is internally partitioned, as shown in FIG. 1, into a sewage accumulator section 12, a heating and oxidizing section 13, and a fly ash collector section 14. The housing has a top wall 16, an inclined wall 17, end walls 18 and 19, side walls 21 and 22 (FIG. 2), and bottom 23.

The sewage accumulator section 12 is enclosed by a portion of the top 16, the end wall 18, a portion of the side wall 21, a portion of the side wall 22, the bottom 23, and an internal partition 28. The internal partition 28 is affixed to the top and side walls and extends downwardly, separating the accumulator section 12 from the heating and oxidizing section 13. An inlet opening 29, suitable for coupling to a tile or soil pipe (not shown), admits sewage to the accumulator section.

Between the lower margin of the internal partition 28 and the bottom plate 23 is the shredding means indicated generally at 31 (FIG. 1). The shredding means includes a rotatable drum shaped element having longitudinal vanes 33 inclined radially counterclockwise as viewed in FIG. 1, the direction of rotation of the drum. The drum is carried on a shaft 36 which is journaled in suitable bearings 37 (FIG. 2) mounted in adapters 40 (FIG. 2) carried on the walls 21 and 22. The drum and its shaft 36 are rotated by a belt 38 and pulley 39 mounted on the shaft 36. The belt is driven by an impeller motor 91, carried on a conventional speed adjusting mount, the speed of rotation imparted to the shredding means being adjusted at the hand wheel 43.

A blade member 41 is affixed to the bottom plate 23 and is in closely spaced relationship to the locus of the peripheral edges of the vanes 33. The blade member 41, which may be fabricated from stainless steel, has a somewhat concave surface 42 (FIG. 1) which cooperates with peripheries of the vanes 33 to shred the sewage to form a fine sludge. The vanes 33 cooperate with the blade member 41 to impart hydraulic head to the sludge sufficient to force or pump it upward through the column 46 (FIG. 1) to the heating and oxidizing section 13.

The heating and oxidizing section 13 is generally rectangular in configuration and is enclosed by a portion of the top wall 16, inclined wall 17, a portion of the side walls 21 and 22, and an internal partition 48. The internal partition 48 is affixed to the end wall 19, to the side wall 21 and to the side wall 22, and extends over vertical internal partition 27 closing against the internal partition 28 to separate the heating and oxidizing section from the column 46 and the fly ash collector section 14. The partition 48 is inclined in two planes toward central longitudinal line 48a and transverse longitudinal line 48b, this serving to center the material moving over the partition in the area of maximum heating. One end of the heating and oxidizing section, receives sludge from the column 46 through the aperture 49 in the plate 48. The effective size of the aperture may be adjusted by means of slot and bolt fasteners 34a (FIG. 2), permitting shifting of the plate. The other end of the heating and oxidizing section is partially opened by the opening 50 in the internal partition 48 which will be described more fully subsequently.

Heat is supplied to the heating and oxidizing section 13 by a flame type heat source 47, such as a conventional blower type gas or oil burner, mounted on top plate 16 by means of brackets 51 with its flame delivery conduit inserted in tube 25 which communicates with chamber 13 through aperture 78.

In operation, as the fine sludge moves through aperture 49 and flows rightwardly over internal partition 48, it is dried and oxidized into fly ash. The steam formed by this process creates a slight pressure within the heating and oxidizing section 13. Since the steam cannot escape to the accumulator section because of the seal provided by a sludge in the column 46, it is forced to exhaust rightwardly, as viewed in FIG. 1, through the opening 50 in the internal partition 48. The fly ash, reaching the right end of the internal partition 48 (as viewed in FIG. 1), is then carried downwardly by the flow stream through the opening 50 and into the fly ash collector section 14.

The fly ash collector section 14 is enclosed by the end wall 19, a poriton of the side walls 21 and 22, the bottom plate 23, a portion of the internal partition 48, and internal partition 27. A door 66 in side wall 21 permits the removal of accumulated fly ash from the section 14.

The fly ash collector section 14 is provided with a vent or outlet aperture 73 through which the steam produced may be discharged to the atmosphere or condensed and the water reused.

Also mounted in the fly ash collector section 14 is a baffle 76 which aids separation of the fly ash from the flow of steam causing it to precipitate to the bottom of the fly ash collector section rather than being carried through aperture 73. In the preferred embodiment of the invention described, the baffle 76 is a single baffle plate affixed to the wall 19 above the vent aperture 73 and extending downwardly and away from the wall 19 and having its lower edge below the bottom of the vent 73. This configuration causes the steam to flow generally downwardly through aperture 50. When the steam enters the fly ash collector section through the opening 50, it has a relatively high velocity and easily carries the fly ash with it into the fly ash collector section. However, because of the large cross sectional area of the fly ash collector section, the velocity is there greatly decreased, causing the fly ash to precipitate. However, the velocity again increases as the steam enters the vent 73, and were it not for the baffle 76, a considerable amount of fly ash would be carried into the vent 73 before it had reached the bottom of the fly ash collector section and would be discharged into the atmosphere. A filter, shown schematically at 75 in FIG. 1, may be provided in the outlet duct to trap any residual fly ash which might be carried there.

Section 14 is further provided with internal partitions 56 and 57 which channel the fly ash into the center of the section for easier clean out when necessary.

Four leveling feet 44 are provided in this invention as a means of leveling unit 11. Leveling is necessary in this invention to allow sludge to flow evenly over internal partition 48, for the even and rapid heating and oxidation.

The operation of motors 61 and 91 is controlled by switch 81 which is in turn regulated by the movement of float 83 which is connected to switch 81 by shaft 84. A suitable mounting bracket 85 is provided for switch 81.

Figure 3:
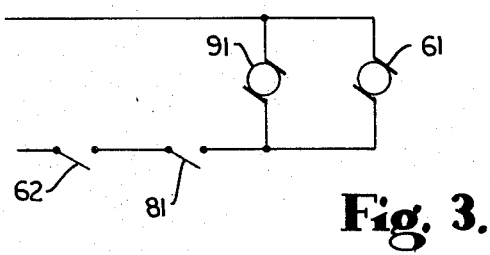
FIG. 3 is a schematic diagram of a control circuit for the apparatus.

FIG. 3 is used to illustrate the electrical control mechanism of the subject invention. In this connection it should be noted that a main power switch 62 is provided for.

Switch 81 as described above, is used to control motors 61 and 91. That is when the level of sewage in compartment 12 reaches a certain level, switch 81 is closed causing the actuation of motors 61 and 91. Therefore when the liquid in compartment 12 reaches a certain point, the pumping of sewage along with its heating and oxidation is commenced.

I claim:
1. Apparatus for treating domestic sewage comprising: a housing divided to provide an accumulator chamber, an adjacent sludge chamber, a heating and oxidizing chamber, and a collecting chamber for the products of combustion, said accumulator chamber being constructed and arranged to receive raw sewage and being provided with a passage between the accumulator chamber and said sludge chamber, shredding and pumping means in the form of a vaned impeller rotated within said passage to shred the sewage into the fine sludge and pump the sludge through said sludge chamber, a sludge output aperture in said sludge chamber providing communication with said heating and oxidizing chamber and through which sludge flows into said heating and oxidizing chamber, burner means constructed and and arranged to project flame into said heating and oxidizing chamber adjacent said sludge output aperture, a combustion products discharge aperture in said oxidizing chamber communicating with said collecting chamber, an outlet aperture in said collecting chamber and a baffle located in said collecting chamber and cooperating with said outlet aperture to cause vapor and gaseous products of combustion introduced into said collecting chamber through said combustion products discharge aperture to alter their direction of flow before entering said outlet aperture, and means for removing solid products of combustion from said collecting chamber.

2. Apparatus for treating sewage as claimed in claim 1 in which a float switch, responsive to the sewage level in said accumulator chamber, controls rotation of said vaned impeller.

3. Apparatus for treating sewage as claimed in claim 1 in which the size of said sludge output aperture is adjustable.

4. Apparatus for treating sewage as claimed in claim 1 in which said heating and oxidizing chamber is physically located above said sludge chamber and said collecting chamber, with the base wall surface of said heating and oxidizing chamber which receives sludge from said sludge output aperture being inclined in two transverse planes to guide the sludge into proximity to the flame projected into the heating and oxidizing chamber by said burner means.

References Cited

UNITED STATES PATENTS

| | | | |
|---|---|---|---|
| 506,879 | 10/1893 | Jewell | 210—152 |
| 1,892,681 | 1/1933 | Rankin | 210—152 X |
| 1,967,197 | 7/1934 | Besselievre | 210—151 X |
| 2,094,909 | 10/1937 | Baily et al. | 210—152 X |
| 2,096,176 | 10/1937 | Harrington | 210—152 X |
| 3,143,498 | 8/1964 | Fordyce et al. | 210—121 X |
| 3,327,855 | 6/1967 | Watson et al. | 210—152 X |

SAMIH N. ZAHARNA, Primary Examiner

F. F. CALVETTI, Assistant Examiner

U.S. Cl. X.R.

210—152, 179, 180